United States Patent [19]

Martinelli

[11] Patent Number: 4,603,666
[45] Date of Patent: Aug. 5, 1986

[54] DEVICE FOR MAINTAINING A CONSTANT OIL LEVEL

[76] Inventor: Giuseppe Martinelli, Via Fratelli Rosselli, 21/3, 20100 - Milano, Italy

[21] Appl. No.: 731,060

[22] Filed: May 6, 1985

[30] Foreign Application Priority Data

May 11, 1984 [IT] Italy .............................. 20884 A/84

[51] Int. Cl.[4] ............................................... F01M 1/00
[52] U.S. Cl. ............................. 123/196 S; 184/103.1; 184/103.2
[58] Field of Search ....................... 123/196 R, 196 S; 184/103 R, 103 A, 6.4

[56] References Cited

U.S. PATENT DOCUMENTS

| | | | |
|---|---|---|---|
| 1,972,962 | 9/1934 | Weber | 184/103 R |
| 2,586,104 | 2/1952 | Smyser | 184/103 R |
| 2,689,628 | 9/1954 | Schott | 184/103 A |
| 3,458,011 | 7/1969 | Dwyer | 184/103 R |
| 3,473,372 | 10/1969 | Klink | 184/103 R |

FOREIGN PATENT DOCUMENTS 153811  12/1980  Japan ..................... 184/6.4

Primary Examiner—E. Rollins Cross
Attorney, Agent, or Firm—Bucknam and Archer

[57] ABSTRACT

The present invention relates to a device for maintaining constant the level of oil, particularly in internal combustion engines, which has the particularity of comprising a constant level reservoir (1) positioned at a pre-determined nipple level and in free communication with the oil sump (20) of an engine. The said constant level reservoir (1) is in communication with the reserve reservoir (12) which is positioned at a higher level than the constant level reservoir (1). In the constant level reservoir (1) there are provided float means (21) which control the communication duct (11) between the reserve reservoir (12) and the constant level reservoir (1).

10 Claims, 4 Drawing Figures

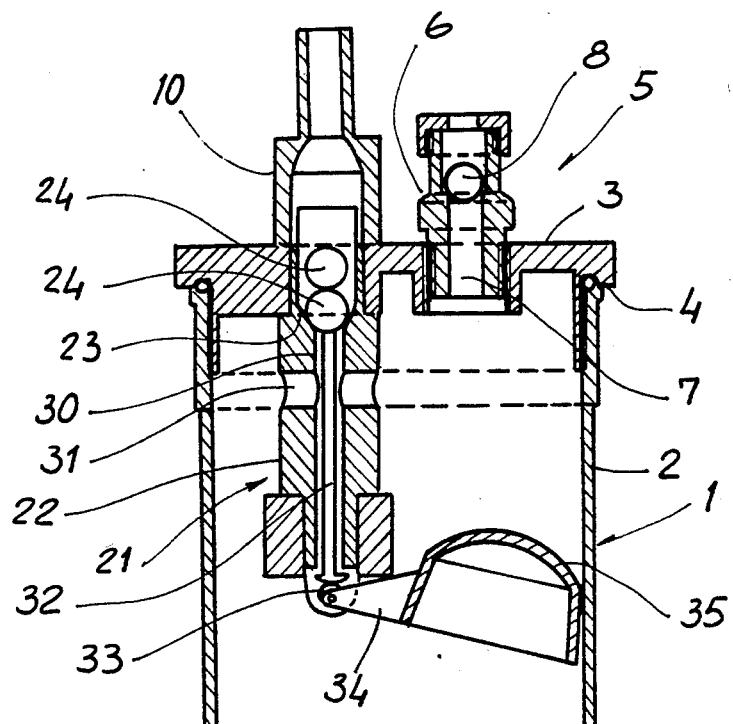
Fig. 2
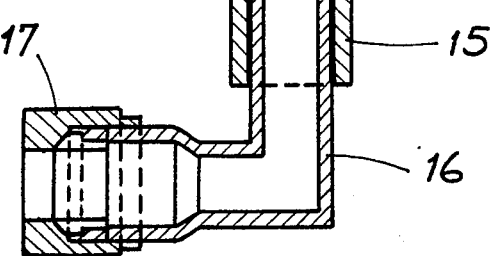
Fig. 3
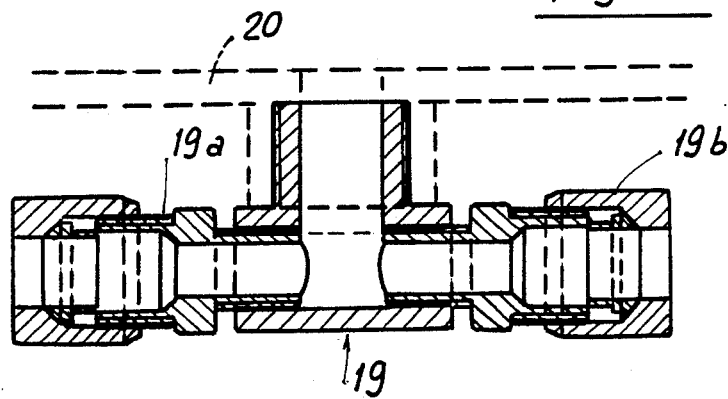

DEVICE FOR MAINTAINING A CONSTANT OIL LEVEL

The present invention relates to a device for maintaining a constant oil level and is particularly adapted for use in an internal combustion engine.

BACKGROUND OF THE INVENTION

It is known, that a problem which is currently very much under consideration as far as internal combustion engines are concerned is that of the periodic testing of the lubricating oil level in the engine sump, for preventing the level of oil from falling below a pre-determined level. At present this testing relies on the diligence of the vehicle user who must periodically test the level of oil and, if necessary, must effect periodic refilling of the oil.

It is readily appreciated that forgetting to make such tests can lead to serious damage to the engine.

In order to obviate this disadvantage there have already been introduced solutions which involve the utilisation of float devices positioned within the oil sump and which, consequently, are extremely complex from the structural point of view and in practice applicable only to newly built engines. Moreover, the known solutions have a significant constructional complexity and are not very reliable in that they are easily subjected to blockages and thus to operational failure.

SUMMARY OF THE INVENTION

The present invention seeks therefore to eliminate the disadvantages indicated hereinabove by providing a device for maintaining constant the level of oil, particularly in an internal combustion engine, which will be made in such a way that it can be easily and rapidly fitted even to existing engines without requiring particular complications of installation. The present invention also seeks to provide a device which will make it possible to maintain the oil level by exploiting the law of physics of communicating vessels with the consequent significant constructional simplicity which results in blockages being totally absent and therefore no operational failures.

Another feature of the present invention is that it provides a device which automatically withdraws oil from a reserve reservoir allowing the continuous and automatic restoration of any oil which may be lost from the oil sump. Further, the present invention provides a device which, by its particular characteristics, is able to offer the widest guarantee of reliability and security in use.

Finally, the present invention provides a device for maintaining constant a level of oil in an internal combustion engine, particularly a high capacity engine such as that fitted to a heavy motor vehicle, which can be produced easily starting from elements and materials which are readily commercially available and which, moreover, will be competitive from an economic point of view.

According to the present invention there is provided a device for maintaining constant the level of oil in an internal combustion engine, characterised by the fact that it comprises a constant level reservoir which can be positioned at a predetermined level and in free communication with the oil sump of an engine, the constant level reservoir being in communication with a reserve reservoir positioned at a higher level than the constant level reservoir, there being provided float means controlling a communication duct between the reserve reservoir and the constant level reservoir.

BRIEF DESCRIPTION OF THE DRAWINGS

One embodiment of the present invention will now be more particularly described, by way of example, with reference to the accompanying drawings, in which:

FIG. 2 is a longitudinal sectional view of the constant level reservoir;

FIG. 3 is a sectional view of the connection element joined to the bottom of the oil sump;

DESCRIPTION OF THE PREFERRED EMBODIMENT

Figure 1:
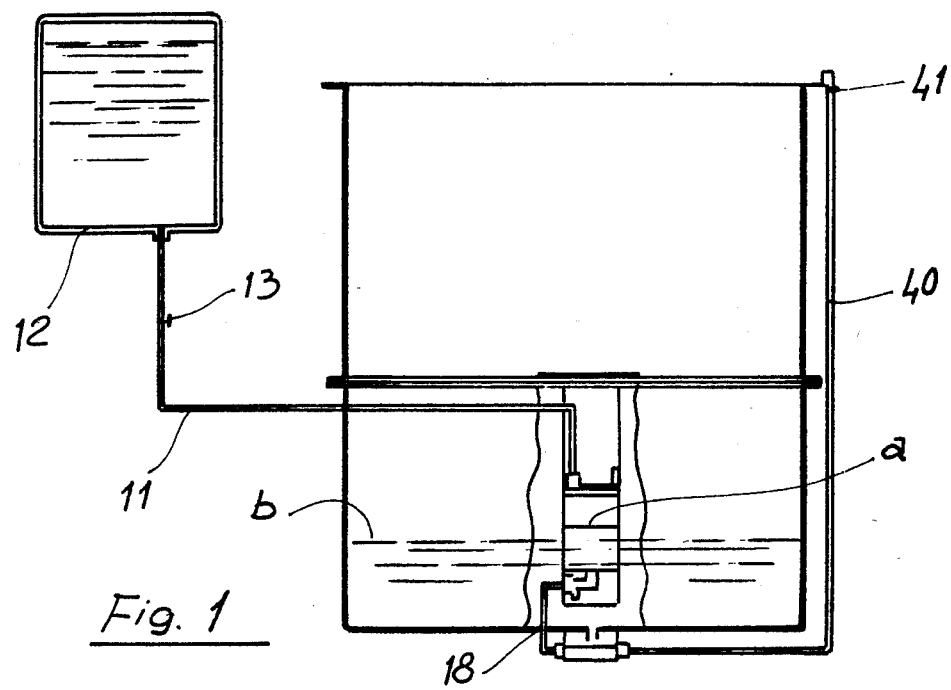
FIG. 1 is a schematic illustration of the device of the invention fitted to the oil sump of an engine.

Referring now to the drawings, the device for maintaining constant the oil level in an internal combustion engine, which constitutes the subject of the present invention, comprises a constant level reservoir generally indicated with the reference numeral 1 which can be positioned with means which will be described hereinbelow, at a level which can be predetermined.

As will be seen better in FIG. 2, the constant level reservoir 1 has a body 2 preferably of cylindrical shape which is closed at the top by a cover 3 which is sealed by the fitting of a seal 4. The cover 3 defines the seat for the introduction of a unidirectional breather valve, generally indicated with the reference numeral 5, which has a body 6 defining within it a through passage 7 controlled by a ball 8 which is held in place only by gravity.

Alongside the breather valve 5 there is provided a coupling 10 which is in communication, via a communication duct 11, with a reserve reservoir 12 which must be positioned at a higher level than the constant level reservoir 1. In the duct 11 is provided a tap 13. The constant level reservoir 1 is provided in its lower part with a discharge connection 15 in which is fitted an elbow connector 16 provided with a clamping nut 17 for connection, by means of a connection duct 18, to a T-connector 19, connected as will be clarified better below, to the bottom of the oil sump 20 of the engine in such a way as to allow free communication between the interior of the constant level reservoir 10 and the oil sump so that the level of oil within the sump is maintained automatically at the level imposed by the oil in the constant level reservoir by the law of physics of communicating vessels.

Within the constant level reservoir 1 there act float valve means, generally indicated with the reference numeral 21, which in practice control the passage of oil from the communication duct 11.

The float valve 21 comprises a cylindrical body 22 the upper part of which is connected to the connector 10 and which defines a valve shutter seat 23 within which act closure balls 24 which rest on the bottom of the seat to block communication with the communication duct 11. In the bottom of the seat 23 there is provided an oil escape passage 30 leading to the interior of the constant level reservoir 1, which joins with discharge holes 31 which advantageously extend radially with respect to the oil introduction channel itself.

Axially, in the oil introduction duct 30, there acts an actuating rod 32 which at the top is able to act by contact against the valve obturator balls 24 to open the communication and consequently allow the ingress of oil to the interior of the reservoir 1. The actuating rod 32 is in contact at its lower end with the cam end 33 of a lever 34 pivoted near the cam axis and having, at its end opposite the cam end, a floating part which, advantageously, is constituted by a bell 35. The bell 35, when the oil level in the reservoir 1 falls below a predetermined value, itself moves downwardly by the pivoting of the lever 34 and causes, by means of its cam end 33, the actuating rod 32 to rise with consequent raising of the balls 24 which open communication therefore allowing ingress of oil into the reservoir until the desired level conditions have been regained.

The T-coupling 19 has a first lateral arm 19a which, as previously indicated, is connected to the connection duct 18 which puts it into communication with the interior of the constant level reservoir 1; opposite the first arm 19a there is provided a second arm 19b from which extends a discharge duct 40 which, in conditions of use of the engine, can be fixed at 41 at the upper part of the oil sump to prevent the escape of oil.

Whenever it is desired to empty the oil sump it is sufficient to release the discharge duct from the upper support 41 and connect it to a discharge pump which enables complete extraction of the oil from the sump without being constrained to execute unscrewing of plugs or other difficult operations.

It should be noted that, during the discharge of oil from the engine sump, the tap 13 is operated to close the communication duct 11 to prevent new oil being introduced into the interior of the engine sump. The discharge duct 40 can also possibly be utilised to effect introduction of oil to the interior of the sump by applying to it an oil pump or other similar device.

Figure 4:
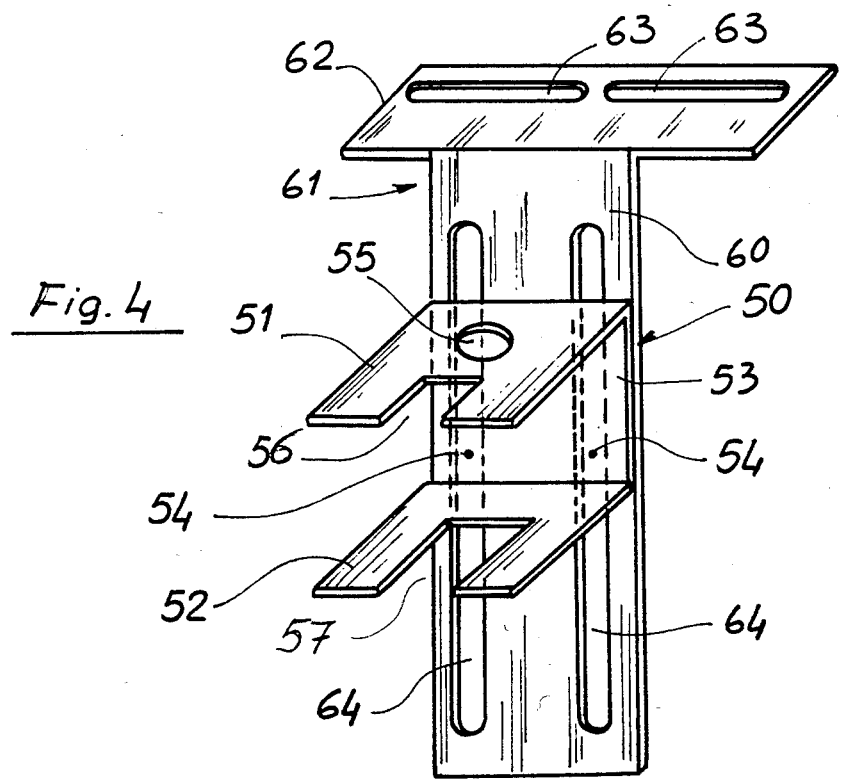
FIG. 4 is a schematic perspective view of the support element for the connection of the device to the oil sump in an engine.

Another important characteristic of the invention is constituted by the fact that the fitting of the device is extremely simple. To this end the support device illustrated in FIG. 4 is utilised, which has a substantially U-shape bracket, generally indicated 50, which has an upper arm 51 and a lower arm 52 which are disposed to lie substantially horizontally and which are joined together by a vertical connection section indicated 53. The connection section 53 has a pair of clamping holes 54 which can be engaged by bolts which allow the connection of the bracket 50 at a pre-determined level on the vertical arm 60 of a bracket 61 which has a horizontal arm 62 which is provided with elongate slots 63 which can be engaged by clamping bolts normally provided in the oil sump flange.

On the vertical arm 60 there are provided longitudinal slits 64 disposed in positions corresponding to the holes 54 in such a way that it is possible, with ease and simplicity, to set the desired level for the positioning of the U-shape bracket 50. The U-bracket 50 has, on its arm 51, a through hole 55 where the coupling 10 can be advantageously lodged; adjacent the through hole 55 there is provided a cut-out 56 where a breather valve 5 can be lodged.

The lower arm 52 has a deep recess 57 which is advantageously connectable to the discharge coupling 15 of the constant level reservoir 1, thus having the possibility of firmly retaining the reservoir itself. Added to what has already been said, advantageously the constant level reservoir 1 as well as the reserve reservoir 12 can be made in optically transparent material in such a way as to allow a precise and rapid visual check of the oil level from the outside.

The operation of the device illustrated above is extremely simple. In fact, after having fitted the device itself, using the support illustrated in FIG. 4, at the predetermined level, as soon as the level of oil falls below the predetermined value depending on the positioning of the bell float 35, the communication provided by the communication duct 10 opens and this allows the introduction of oil into the constant level reservoir.

As soon as the predetermined level is reached the bell float effects closure of the communication and prevents further oil from being introduced into the constant level reservoir 1. In these conditions the oil level in the interior of the oil sump therefore remains always regulated at a determined value with the result that when the motor is stopped the level achieves a certain value, indicated A, whilst while the engine is in motion, the level falls to an optimum level indicated B.

From what has been illustrated above it will therefore be seen how the invention achieves the objects set out in the introduction, and in particular it is underlined that the invention makes available a device which can easily be fitted even to already existing engines.

What I claim is:

1. A device for maintaining constant the level of oil in an internal combustion engine, said internal combustion engine having a sump (20), which comprises a constant level reservoir (1), a duct (15) connecting said constant level reservoir to the bottom of the sump, whereby the level within the sump is maintained at the level in the constant level reservoir, a reserve reservoir, (12), positioned at a level higher than the constant level reservoir, outside the sump, duct means (11) for placing said constant level reservoir in communication with said reserve reservoir, float means (21) in said constant level reservoir for controlling flow in said duct means.

2. A device according to claim 1, wherein said constant level reservoir (1) and said reserve reservoir (12) are made of an optically transparent material.

3. The device according to claim 1 wherein said constant level reservoir has a cover (3), and the device comprises a unidirectional breather valve (5) fitted within said cover.

4. A device according to claim 1 wherein in said duct means a tap (13) is located for controlling the flow in said duct means.

5. A device according to claim 1, wherein said float means comprises a lever (34) pivoted to a valve body housed within the said constant level reservoir (1), the said lever (34) having at one end a bell float (35) and at the other end a cam portion (33) acting on an actuating rod (32) in contact at its upper end with valve shutter balls (24) in contact with a valve shutter seat (23) formed in correspondence with the connector (10) for the said communication duct (11), said bell float moving downwardly when the oil level in the constant level reservoir falls below a predetermined valve and causing said actuating rod and said shutter balls to rise whereby oil is introduced from said reserve reservoir into said constant level reservoir.

6. A device according to claim 1 wherein said constant level reservoir has at the bottom an elbow connector (16), connected by means of connection duct (18) to a side arm (19a) of a T-connector (19) connected to the bottom of said oil sump.

7. A device according to claim 6 wherein said T-connector (19) has a second side arm (19b) in communication with a discharge duct (40), said duct having its free end fixedly connectable to the upper part (41) of said oil sump (20).

8. A support for a device for maintaining constant the level of oil in an internal combustion engine, said internal combustion engine having an oil sump, the device comprising a constant level reservoir (1), a duct (15) connecting said constant level reservoir to the bottom of the sump whereby the level within the sump is maintained at the level in the constant level reservoir, a reserve reservoir (12) positioned at a level higher than the constant level reservoir, duct means (11) for placing said constant level reservoir in communication with said reserve reservoir, float means (21) in said constat level reservoir for controlling flow in said duct means, said support comprising a substantially U-shape bracket (50) connectable to the vertical arm (60) of a mounting frame (61), the mounting frame (61) being provided with a horizontal arm (62) for fixing to said oil sump (20), said support bracket (50) being operable to support the said constant level reservoir (1), said bracket having two horizontal arms, (51) and (52), a vertical panel connecting said two horizontal arms, said bracket being fixed at a predetermined level onto said vertical arm.

9. The support according to claim 8 wherein said vertical arm is provided with elongate slots (64), said vertical panel has a plurality of opening, (54), said slots (64) being disposed in correspondence with the openings (54).

10. The support according to claim 8 wherein said bracket (50) has on its upper arm (51) a hole (55) for housing a connector for said communication duct (11) and a notch (56) for receiving said breather valve (5), the lower arm (52) having a recess (57) for receiving said elbow connector (16).

* * * * *